(12) United States Patent
Frank

(10) Patent No.: US 9,029,820 B2
(45) Date of Patent: May 12, 2015

(54) IMAGE STORAGE DEVICE INCLUDING STORAGE PHOSPHOR POWDER, METHOD OF FORMING IMAGE STORAGE DEVICE, AND COMPUTED RADIOGRAPHY APPARATUS

(71) Applicant: John M. Frank, Hartville, OH (US)

(72) Inventor: John M. Frank, Hartville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 205 days.

(21) Appl. No.: 13/712,324

(22) Filed: Dec. 12, 2012

(65) Prior Publication Data

US 2013/0161518 A1   Jun. 27, 2013

Related U.S. Application Data

(60) Provisional application No. 61/579,470, filed on Dec. 22, 2011.

(51) Int. Cl.
*G01T 1/20* (2006.01)

(52) U.S. Cl.
CPC .............. *G01T 1/2012* (2013.01); *G01T 1/2006* (2013.01); *G01T 1/2014* (2013.01)

(58) Field of Classification Search
USPC ................................ 250/484.4, 580, 581, 582
See application file for complete search history.

(56) References Cited

U.S. PATENT DOCUMENTS

| | | | |
|---|---|---|---|
| 4,380,702 A | 4/1983 | Takahashi et al. | |
| 5,171,996 A | 12/1992 | Perez-Mendez | |
| 5,418,377 A | 5/1995 | Tran et al. | |
| 5,904,781 A | 5/1999 | Goodman et al. | |
| 6,177,236 B1 | 1/2001 | Apte | |
| 6,300,640 B1 | 10/2001 | Bhargava et al. | |
| 6,359,285 B1 * | 3/2002 | Tasaki et al. | 250/484.4 |
| 7,161,160 B2 | 1/2007 | Leblans et al. | |
| 2005/0167622 A1 * | 8/2005 | Mitchell et al. | 250/585 |
| 2008/0006780 A1 | 1/2008 | Isoda | |

FOREIGN PATENT DOCUMENTS

| | | |
|---|---|---|
| EP | 0126564 A2 | 11/1984 |
| EP | 1355322 A2 | 10/2003 |

(Continued)

OTHER PUBLICATIONS

International Search Report for PCT/US2012/069185 dated Mar. 25, 2013, 4 pgs.

(Continued)

*Primary Examiner* — Mark R Gaworecki
(74) *Attorney, Agent, or Firm* — Abel Law Group, LLP; Robert N. Young

(57) ABSTRACT

An image storage device includes a substrate including a plurality of voids and a septum disposed between the voids, and cells including a storage phosphor powder within the voids. In an embodiment, a computed radiography apparatus includes an image storage device, a stimulating radiation device to generate stimulating radiation, and a photosensor to detect light. In another embodiment, a method of forming an image storage device includes providing a patterned substrate that includes a plurality of voids and a septum disposed between the voids, adding a storage phosphor powder into the voids of the patterned substrate to form cells, and applying a topcoat layer that is substantially free of the storage phosphor powder.

25 Claims, 6 Drawing Sheets

(56) References Cited

FOREIGN PATENT DOCUMENTS

| EP | 1161693 B1 | 10/2009 |
|---|---|---|
| JP | 2002-340892 A | 11/2002 |
| JP | 2008-014892 A | 1/2008 |
| WO | 2008-117589 A1 | 10/2008 |

OTHER PUBLICATIONS

"CR vendors challenge DR with novel research efforts" dated Apr. 29, 2005, 2 pgs. http://www.diagnosticimaging.com/direct-radiography/content/article/113619/1196847.

Derenzo et al., "Scintillation Properties," <http://lbl.gov>, Lawrence Berkeley National Laboratory, printed Mar. 4, 2013, 10 pages.

J A Rowlands, "Topical Review—The Physics of Computed Radiography," Institute of Physics Publishing, PII: S0031-9155(02)24746-6, Physics in Medicine and Biology, vol. 47, dated 2002, pp. R123-R166.

Ralph Schaetzing, PHD, Computed Radiography Technology, Digital Radiographic Acquisition Technologies, Advances in Digital Radiography: RSNA Categorical Course in Diagnostic Radiology Physics, dated 2003, 16 pages.

Leblans et al., "Storage Phosphors for Medical Imaging," Open Access, Materials, vol. 4, ISSN 1996-1944, <www.mdpi.com/journal/materials>, dated 2011, 53 pages.

\* cited by examiner

IMAGE STORAGE DEVICE INCLUDING STORAGE PHOSPHOR POWDER, METHOD OF FORMING IMAGE STORAGE DEVICE, AND COMPUTED RADIOGRAPHY APPARATUS

CROSS-REFERENCE TO RELATED APPLICATION

This application claims priority under 35 U.S.C. §119(e) to U.S. Patent Application No. 61/579,470 entitled "Image Storage Device Including Storage Phosphor Powder, Method of Forming Image Storage Device, and Computed Radiography Apparatus," by Frank, filed Dec. 22, 2011, which is assigned to the current assignee hereof and incorporated herein by reference in its entirety.

FIELD OF THE DISCLOSURE

The present disclosure is directed to radiation detectors and more particularly to image storage devices for use in computed radiography applications.

BACKGROUND

Computed radiography (CR) is based on the use of photostimulable phosphors, also known as storage phosphors. In CR imaging plates that utilize storage phosphors, a useful image is not derived from light emitted in prompt response to incident X-ray radiation, but rather from subsequent emission when the latent image, consisting of trapped charge, is optically stimulated (e.g., using laser light) and released from metastable traps. This triggers a process called photostimulated luminescence ("PSL") resulting in the emission of light of a shorter wavelength than the laser light in an amount that is proportional to the original absorbed X-ray irradiation.

For powder based storage phosphor CR imaging plates, a "doctor blade" technique may be used to spread a binder loaded with a storage phosphor onto a substrate to form a continuous uniform layer. Photostimulation laser light scattering in the phosphor during readout and photostimulated light scattering before exiting the storage phosphor layer may result in poor image quality. Alternatively, vapor deposition may be used to grow needle like structures of phosphor. However, growing needle like structures by vapor deposition is slow, expensive, and potentially size limited.

BRIEF DESCRIPTION OF THE DRAWINGS

Embodiments are illustrated by way of example and are not limited in the accompanying figures.

Figure 1:
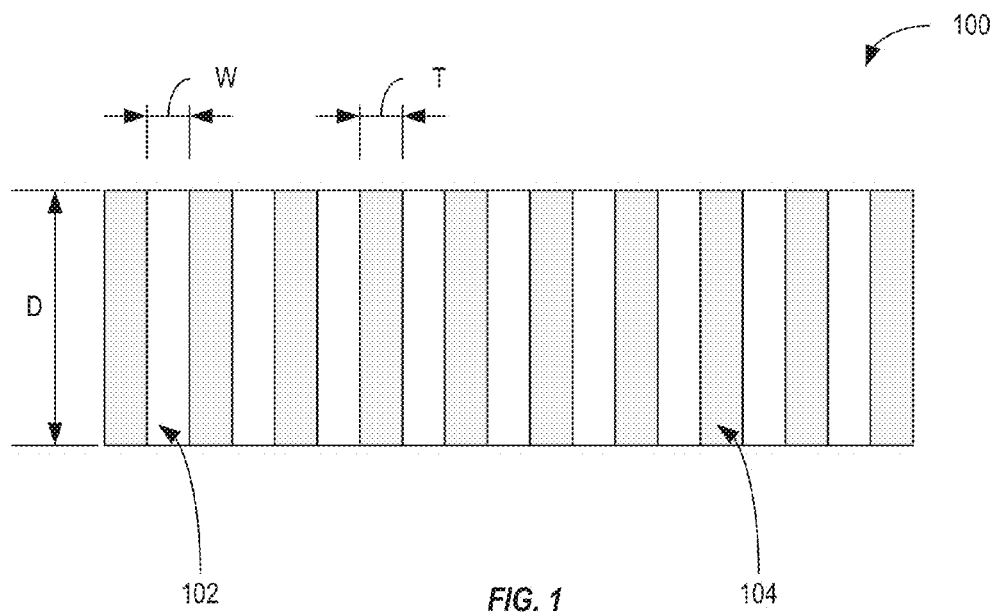
FIG. 1 is a cross-sectional view of a substrate of an image storage device in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Before addressing details of embodiments described below, some terms are defined or clarified. As used in this specification, the term "rare earth" or "rare earth element" is intended to mean Y, Sc, La, and the Lanthanides (Ce to Lu) in the Periodic Table of the Elements. In chemical formulas, a rare earth element will be represented by "RE." Rare earth elements can be in a divalent state (e.g., Nd, Sm, Eu, Dy, Tm, and Yb), a trivalent state, or a tetravalent state (e.g., Ce, Pr, and Tb).

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

The present disclosure describes installing storage phosphor powders into a plurality of cells of a substrate such that they mimic pixels or needles in light handling. Instead of using a doctor blade technique of spreading an epoxy or other binder loaded with a storage phosphor onto a substrate to form a continuous layer, the present disclosure describes loading the storage phosphor powder into a structured body where the storage phosphor powder is packed in cells that act like high aspect ratio pixels during readout. This may limit the spread of stimulating radiation (e.g., laser light) and help guide stimulated light to the exit surface, limiting its scatter. Both of these may improve image quality from the image storage device (e.g., a CR image storage "plate") compared to a conventional CR image storage plate that is coated with a storage phosphor layer using a doctor blade technique.

In a particular embodiment, an image storage device may include a substrate including a plurality of voids and a septum (or septa) disposed between the voids, and cells that include storage phosphor powder within the voids.

In another embodiment, a computed radiography apparatus may include an image storage device, a stimulating radiation device to generate stimulating radiation, and a photosensor to detect light. The image storage device may include a substrate including a plurality of voids and a septum disposed between the voids, and cells that include storage phosphor powder within the voids.

In another embodiment, a method of forming an image storage device may include providing a patterned substrate that includes a plurality of voids and a septum disposed between the voids. The method may include adding a storage phosphor powder into the voids of the patterned substrate to form cells. The method may further include applying a topcoat layer that is substantially free of the storage phosphor powder. The topcoat layer may be scratch resistant.

FIG. 1 is a cross-sectional view of a particular illustrative embodiment of a substrate 100 prior to the addition of storage phosphor powder. The substrate 100 of FIG. 1 includes a plurality of voids 102 and a septum 104 disposed between the voids 102. An image storage device (e.g., a CR image storage "plate") may be formed by adding, packing or otherwise incorporating a storage phosphor powder into the voids 102 of the substrate 100 to form cells 202 (See FIG. 2). Persons of ordinary skill in the art will appreciate that it may be advisable to maximize the packing density of the cells 202 and to minimize the thickness of the septum 104.

In the cross-sectional view of FIG. 1, the voids 102 have a first dimension (W) that represents a width (i.e., a distance between walls of the voids 102 that are defined by the septum 104) and a second dimension (D) that represents a depth (i.e., a distance from a surface of the substrate 100 into which the storage phosphor powder is packed).

In a CR image storage plate that is coated with a storage phosphor layer using a doctor blade technique, the sensitivity to X-ray radiation can be heightened by increasing the thickness of the storage phosphor layer. However, by increasing the thickness of the storage phosphor layer in order to heighten the sensitivity, the sharpness is lowered (due to laser light scatter and photostimulated light scatter during readout). The sharpness can be heightened by decreasing the thickness of the storage phosphor layer. However, when the thickness of the storage phosphor layer is decreased in order to heighten the sharpness, the sensitivity to X-ray radiation is lowered. Thus, the thickness of the storage phosphor layer that is applied using the doctor blade technique may be limited.

By packing a storage phosphor powder into the voids 102 of the substrate, the thickness (i.e., the depth D in FIGS. 1 and 2) can be maintained without a sacrifice in sensitivity. The walls of the voids 102 may limit the spread of stimulating laser light in the storage phosphor powder and guide the stimulated light to the exit face, improving the detector modulation transfer function ("MTF") and spatial resolution. This may allow the cells 202 that include the storage phosphor powder within the voids 102 to be thicker than a storage phosphor layer applied to the surface of a substrate via a doctor blade approach. Accordingly, with respect to the depth (D), in a particular embodiment, the cells 202 may have an average depth that is not less than about 100 µm, such as not less than about 200 µm, or not less than about 300 µm. Further, the cells 202 may have an average depth that is not greater than about 800 µm, such as not greater than about 700 µm, or not greater than about 600 µm.

In a particular embodiment, the substrate 100 may be a patterned substrate. For example, the substrate 100 can be etched or machined to produce features that provide a wall (e.g., the septum 104) between each of the voids 102 in order to separate the cells 202 that include the storage phosphor powder into pixels. In a particular embodiment, the substrate 100 may include a patterned semiconductor substrate (e.g., a silicon substrate). As another example, the substrate 100 may include a patterned metallic substrate. As a further example, the substrate 100 may include a patterned non-metallic substrate (e.g., a ceramic or plastic substrate). Persons of ordinary skill in the art will appreciate that other types of materials may be used to produce a patterned substrate.

Figure 3:
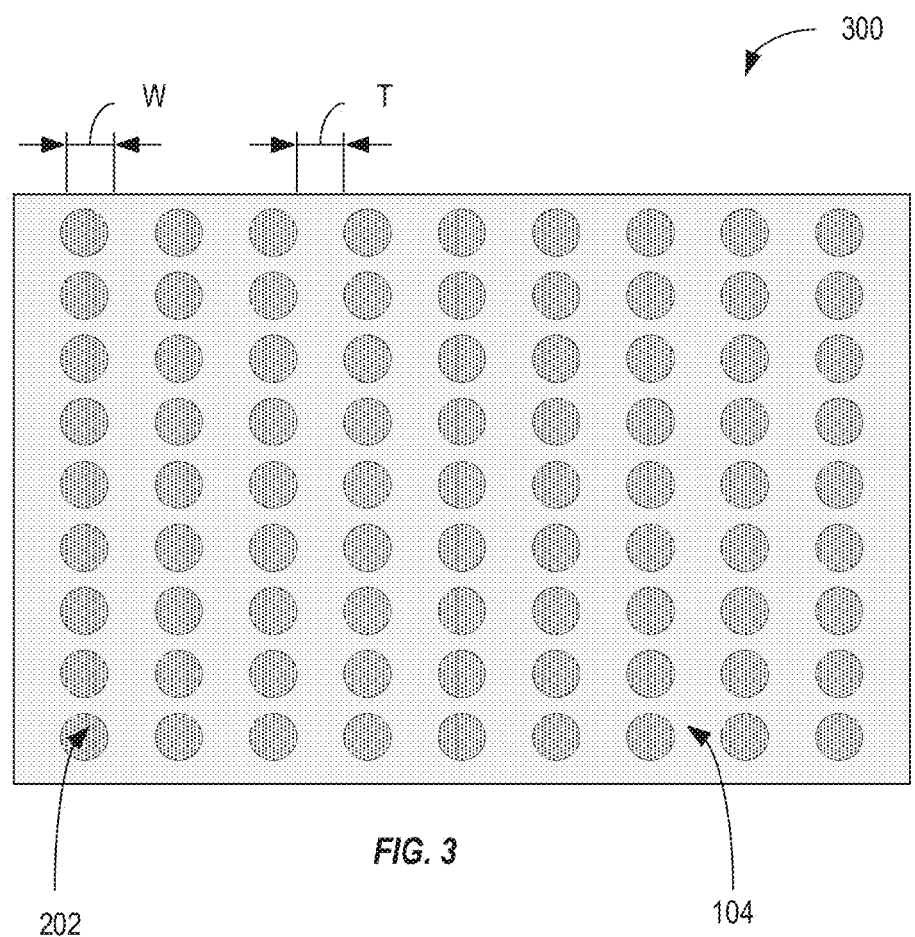
FIG. 3 is a top view of a patterned substrate in accordance with an embodiment.
Figure 4:
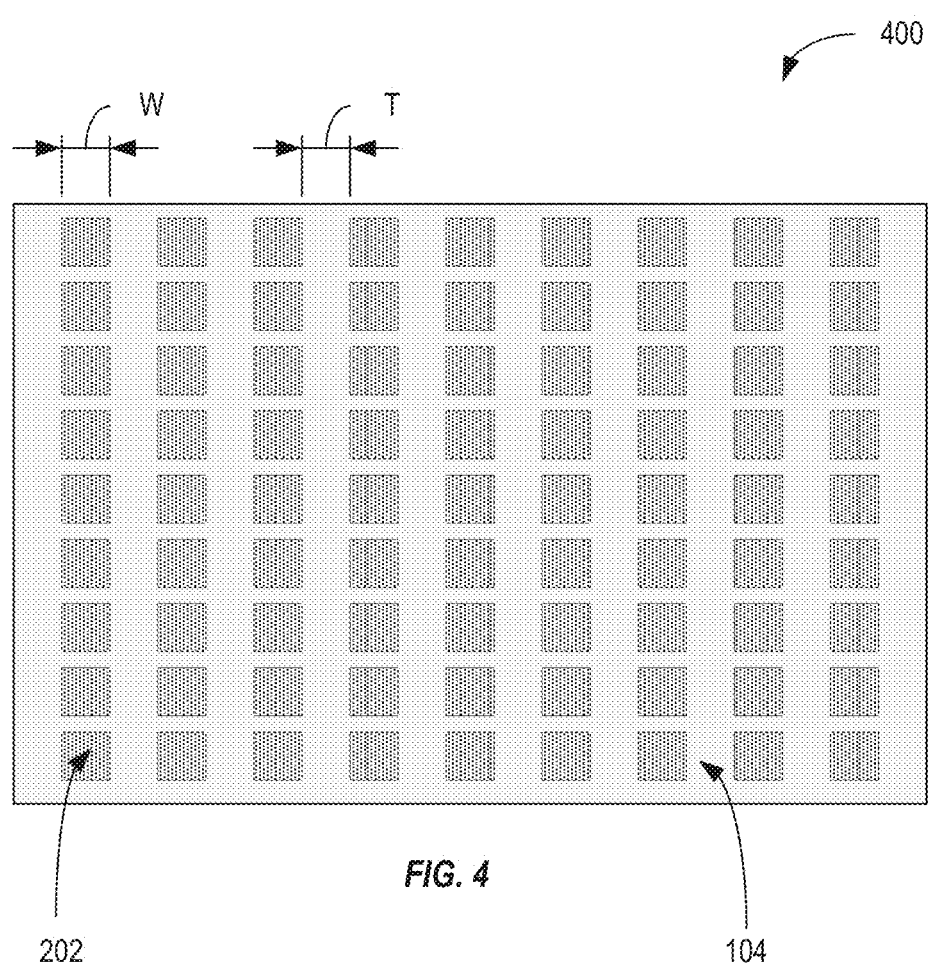
FIG. 4 is a top view of a patterned substrate in accordance with another embodiment.
Figure 5:
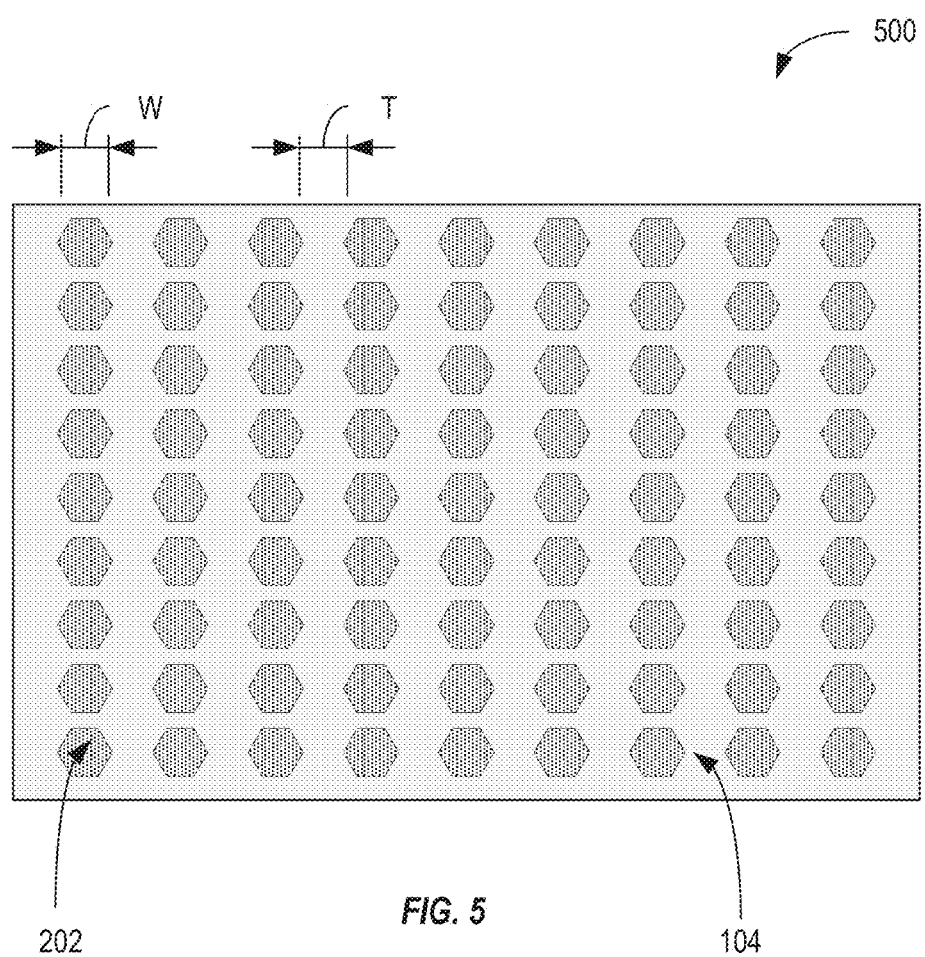
FIG. 5 is a top view of a patterned substrate in accordance with another embodiment.

As an illustrative example, from a top view, the cells 202 may include circular shaped cells (such as illustrated in the embodiment of FIG. 3). Alternatively, from a top view, the cells 202 may include polygonal shaped cells. For example, the cells 202 may include rectangular or square shaped cells (such as illustrated in the embodiment of FIG. 4), or the cells 202 may include hexagonal shaped cells (such as illustrated in the embodiment of FIG. 5). Persons of ordinary skill in the art will appreciate that, from a top view, the cells 202 may have alternative shapes. In a particular embodiment, the substrate 100 may be patterned such that the cells 202 are arranged in a cell pattern that corresponds to a raster pattern of a laser that is operable to stimulate the storage phosphor powder within the cells 202.

In an embodiment where the cells 202 have a circular shape from a top view (such as illustrated in the embodiment of FIG. 3), the width of the cells 202 may represent a maximum dimension. Alternatively, from a top view, the cells 202 may have a maximum dimension that is greater than the width (W) illustrated in the cross-sectional view of FIG. 2. To illustrate, in the case of polygonal shaped cells (such as illustrated in the embodiments of FIGS. 4 and 5), the maximum dimension from a top view may be a diagonal distance. In a particular embodiment, from a top view, each of the cells 202 may have a maximum dimension that is not less than about 10 µm, such as not less than about 20 µm, or not less than about 30 µm. Further, each of the cells 202 may have a maximum dimension that is not greater than about 70 µm, such as not greater than about 60 µm, or not greater than about 50 µm. As an illustrative, non-limiting example, each of the cells 202 may have a maximum dimension of between about 30 µm and about 50 µm.

The septum 104 has a dimension (T) that represents the thickness of the septum 104 when viewed in cross-section (i.e., the thickness of the walls that separate the cells 202). In a particular embodiment, the septum 104 that serves to separate the storage phosphor powder within the cells 202 may have an average thickness that is not less than about 0.1 µm, such as not less than about 1 µm, not less than about 5 µm, or not less than about 10 µm.

Figure 2:
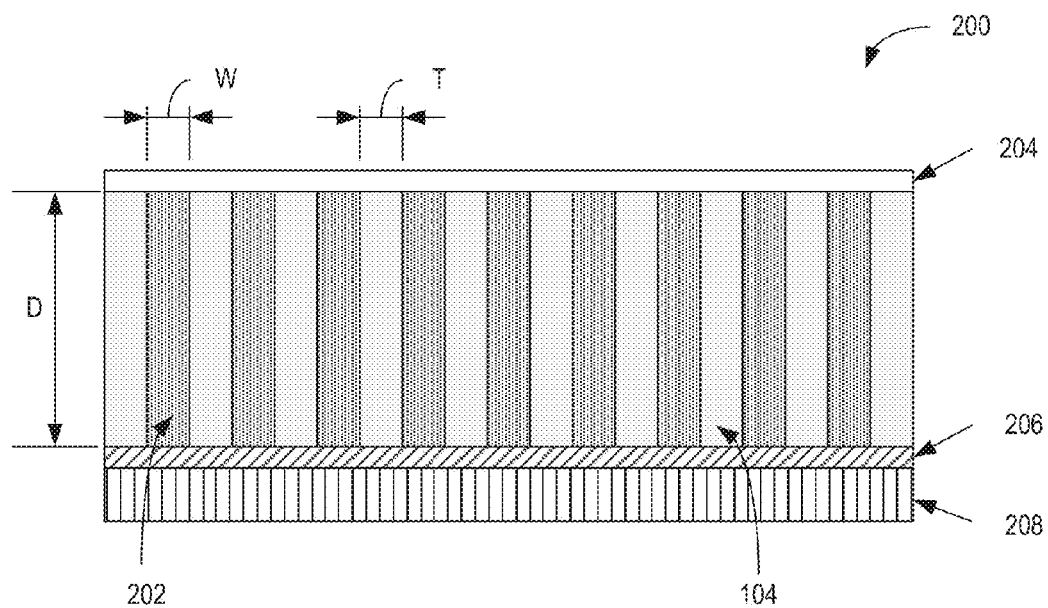
FIG. 2 is a cross-sectional view of an image storage device in accordance with an embodiment.

Referring to FIG. 2, a cross-sectional view of a particular embodiment of an image storage device is illustrated and generally designated 200. FIG. 2 illustrates the substrate 100 of FIG. 1 after the voids 102 have been packed with a storage phosphor powder. That is, the image storage device 200 of FIG. 2 may include a substrate 100 having a plurality of voids 102 and a septum 104 disposed between the voids 102, and cells 202 including a storage phosphor powder within the voids 102. Persons of ordinary skill in the art will appreciate that the cells 202 of FIG. 2 may include not only the storage phosphor powder but also other materials (e.g., a binder).

During radiation exposure (e.g., X-ray exposure), the storage phosphor powder of the image storage device 200 absorbs radiation. The storage phosphor powder may then be exposed to stimulating radiation (e.g., laser light), which causes the storage phosphor powder to emit light in proportion to the amount of energy stored during irradiation. Thus, during X-ray radiation exposure, the storage phosphor powder within each of the cells 202 of the image storage device 200 stores energy in proportion to the number of X-rays that are absorbed and to the energy of those X-rays. Stimulating radiation allows for subsequent image "readout." That is, each of the cells 202 represents a "pixel" of a digital image, with the level of X-ray exposure of each pixel determined based on the amount of "photostimulated light" that is detected during readout.

As an illustrative, non-limiting example, the storage phosphor powder may include a rare earth element. To illustrate, the storage phosphor powder may include a barium halide powder, such as $BaX_2:RE^{3+}$, where "X" includes Br, F, or Cl, and "RE" includes a rare earth element. In a particular embodiment, the storage phosphor powder may include a barium fluorohalide powder. For example, the storage phosphor powder 202 may include $BaFX:RE^{2+}$ powder, where "X" includes Cl, Br, I, or a combination thereof and "RE" includes a rare earth element (e.g., Eu, Nd, Sm, Dy, Tm, or Yb). As an illustrative example, the storage phosphor powder 202 may include $BaFBr:Eu^{2+}$ powder or $BaFI:Eu^{2+}$ powder. As another example, the storage phosphor powder 202 may include $BaFBr_{1-x}I_x:Eu^{2+}$ powder (where x is not less than 0.001). That is, in this case, the storage phosphor powder 202 includes a combination of both Br and I. As an illustrative non-limiting example, x may be about 0.15, such that the storage phosphor powder 202 may include $BaFBr_{0.85}I_{0.15}:Eu^{2+}$ powder.

In another embodiment, the storage phosphor powder 202 may include $CsBr:Eu^{2+}$ powder. In a further embodiment, the storage phosphor powder 202 may include $RbBr:Tl^+$ powder. The foregoing examples are for illustrative purposes only. Persons of ordinary skill in the art will appreciate that alternative storage phosphor powders may be used.

In a particular embodiment, the storage phosphor powder may emit scintillating light having a wavelength in a range of between about 300 nm and about 600 nm when exposed to stimulating radiation having a wavelength in a range of between about 500 nm and about 800 nm. As an illustrative example, $BaFBr:Eu^{2+}$ storage phosphor powder may have a light emission peak of about 390 nm and may have a spectrum for stimulation of between about 500 nm and about 650 nm. As another example, $BaFBr_{0.85}I_{0.15}:Eu^{2+}$ storage phosphor powder may have a light emission peak of about 390 nm and may have a spectrum for stimulation of between about 550 nm and about 700 nm. As another example, $BaFI:Eu^{2+}$ storage phosphor powder may have a light emission peak of about 405 nm and may have a spectrum for stimulation of between about 550 nm and about 700 nm.

In a particular embodiment, the storage phosphor powder may be mixed with a binder. Illustrative, non-limiting examples of binders may include nitrocellulose, polyester, acrylic, or polyurethane, among other alternatives. The ratio of the binder to the storage phosphor powder on a weight basis may be not less than about 0.01:1. The ratio of the binder to the storage phosphor powder on a weight basis may be not greater than about 1:1. The binder may be substantially transmissive in the emission wavelength of the storage phosphor powder.

In a particular embodiment, from a top view, the voids 102 may have a maximum dimension of between about 30 μm and about 50 μm. In order to pack the storage phosphor powder particles into the voids 102, particle size distributions of storage phosphor powders may have a mean particle size in a range of between about 1 μm and about 10 μm. As an illustrative example, the storage phosphor powder may have a mean particle size of between about 4 μm and about 5 μm. Further, in a particular embodiment, the storage phosphor powder may have a particle size distribution with a $D_{90}$ that is less than 10 μm, $D_{95}$ that is less than 10 μm, or even a $D_{99}$ that is less than 10 μm. It will be appreciated that the storage phosphor powder may have a maximum particle size that is substantially less than the maximum dimension of the voids 102.

In the particular embodiment illustrated in FIG. 2, the image storage device 200 further includes a topcoat layer 204 overlying a surface of the substrate 100 and overlying the storage phosphor powder 202, and the substrate 100 is disposed between the topcoat layer 204 and a reflective layer 206. The topcoat layer 204 may be substantially free of the storage phosphor powder. Further, the surface of the substrate 100 may be substantially free of the storage phosphor powder.

In the embodiments illustrated in FIGS. 1 and 2, the voids 102 are illustrated as openings from the surface of the substrate 100 into which the storage phosphor powder is packed through the opposite surface of the substrate 100. That is, in the embodiments illustrated in FIGS. 1 and 2, the depth of the voids 102 corresponds to the depth of the substrate 100. It will be appreciated that this represents one embodiment for illustrative purposes only. Alternatively, the depth of the voids 102 may be less than the depth of the substrate 100. That is, the voids 102 may not extend through the entire substrate 100. Further, the reflective layer 206 illustrated in FIG. 2 represents a particular embodiment where the voids 102 completely penetrate the substrate 100. In the case where the voids 102 do not completely penetrate the substrate 100, the reflective layer 206 may be disposed within the voids 102 beneath the cells 202 that include the storage phosphor powder. Thus, the storage phosphor powder may directly overly the reflective layer 206, but the substrate 100 may not directly overly the reflective layer 206. That is, in the case where the voids 102 do not penetrate the entire substrate 100, the reflective layer 206 may be a discontinuous layer that resides within the voids 102 of the substrate 100 beneath the storage phosphor powder but not beneath the septum 104.

In the embodiment illustrated in FIG. 2, the substrate 100 is disposed between the topcoat layer 204 and a backing plate 208 that may be placed onto the substrate 100 for strength. In alternative embodiments, the substrate 100 may be self-supporting and may not include the backing plate 208.

Referring to FIG. 3, a top view of a particular embodiment of a patterned substrate is illustrated and generally designated 300. In a particular embodiment, the patterned substrate 300 of FIG. 3 may correspond to the substrate 100 of FIG. 1 and may be included in the image storage device 200 of FIG. 2. As noted above, FIG. 3 illustrates a top view of a plurality of circular shaped cells arranged in a pattern. Persons of ordinary skill in the art will appreciate that the cells of FIG. 3 may also be substantially circular (e.g., oval or elliptical).

Referring to FIG. 4, a top view of a particular embodiment of a patterned substrate is illustrated and generally designated 400. In a particular embodiment, the patterned substrate 400 of FIG. 4 may correspond to the substrate 100 of FIG. 1 and may be included in the image storage device 200 of FIG. 2. As noted above, FIG. 4 illustrates a top view of a plurality of polygonal (e.g., rectangular or square) shaped cells arranged in a pattern.

Referring to FIG. 5, a top view of a particular embodiment of a patterned substrate is illustrated and generally designated 500. In a particular embodiment, the patterned substrate 500 of FIG. 5 may correspond to the substrate 100 of FIG. 1 and may be included in the image storage device 200 of FIG. 2. As noted above, FIG. 5 illustrates a top view of a plurality of hexagonal shaped cells arranged in a pattern.

While FIGS. 3 to 5 illustrate square-shaped substrates (from a top view), it will be appreciated that the substrate may have alternative shapes. As an illustrative example, the substrate may be a substantially circular semiconductor wafer.

Figure 6:
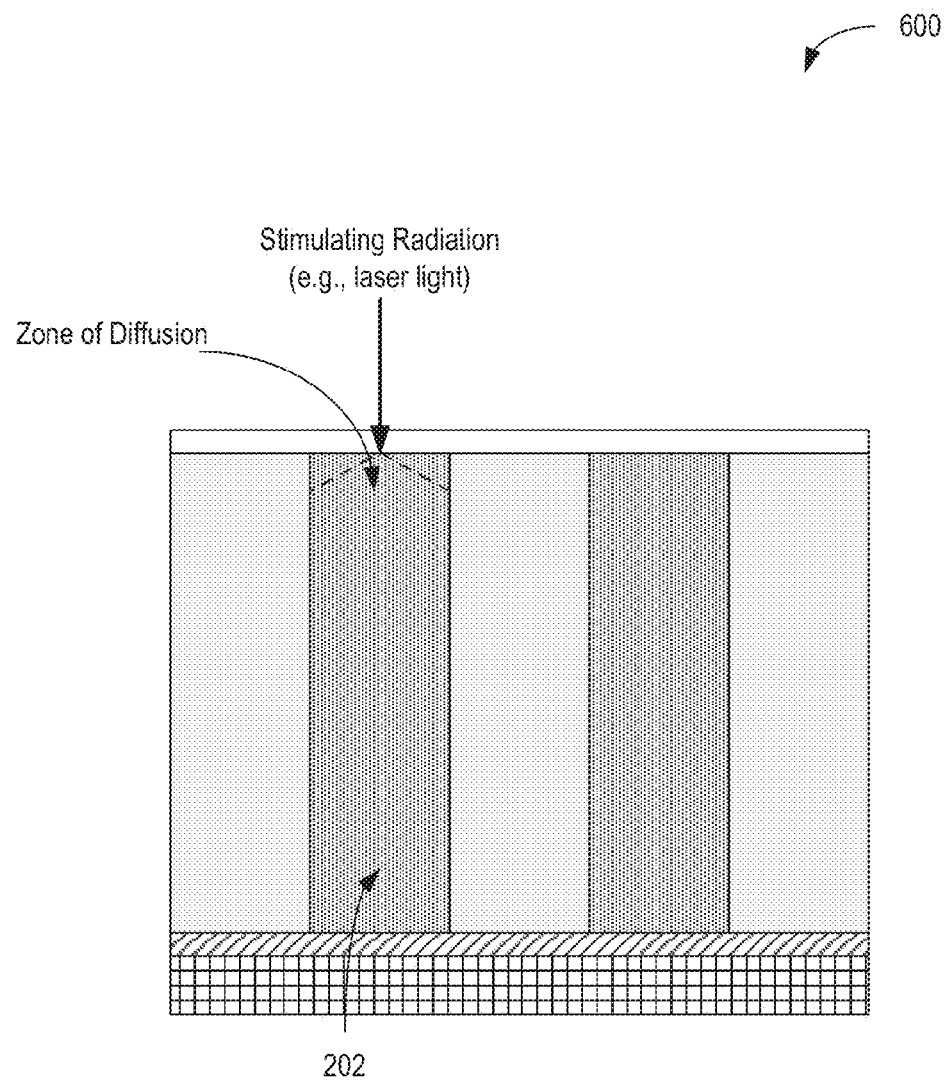
FIG. 6 is a cross-sectional view of a portion of an image storage device being exposed to stimulating radiation in accordance with an embodiment.

Referring to FIG. 6, a cross-sectional view 600 of a portion of the image storage device 200 of FIG. 2 is illustrated. FIG. 6 illustrates that packing the storage phosphor powder into the plurality of voids 102 may improve image quality (i.e., resolution) compared to a conventional CR image storage plate that is coated with a storage phosphor layer using the doctor blade technique.

In a CR image storage plate that is coated with a storage phosphor layer using a doctor blade technique, resolution of the readout is controlled by the spot size (e.g., 30 µm) of the laser that is used to readout the phosphor and the spread/scatter of photons in the phosphor layer. Scattering and multiple reflections within the layer distribute the light energy from the point of generation. The distribution of light results in an increase of the line spread function ("LSF") and a degradation of the modulation transfer function ("MTF"). An increase in the LSF and a degradation of the MTF may result in decreased resolution of a digital image. To counteract the spreading out of the optical photons within the storage phosphor layer during readout, the thickness of the layer may be reduced. However, the thinner the storage phosphor layer, the lower its conversion efficiency, since there are fewer storage phosphor particles with which a photon may collide.

FIG. 6 illustrates that packing storage phosphor powder into a plurality of voids 102 such that they mimic pixels or needles in light handling may limit the spread of stimulating radiation (e.g., laser light). That is, packing the storage phosphor powder into the plurality of voids 102 may result in a decrease in the line spread function. As a result, the thickness (i.e., D in FIGS. 1 and 2) of the storage phosphor powder may be increased compared to the doctor blade approach. For example, the cells 202 may have an average depth that is between about 300 µm and about 800 µm, such as about 600 µm. This may increase the conversion efficiency, as there are more storage phosphor particles with which a photon may collide during readout.

Figure 7:
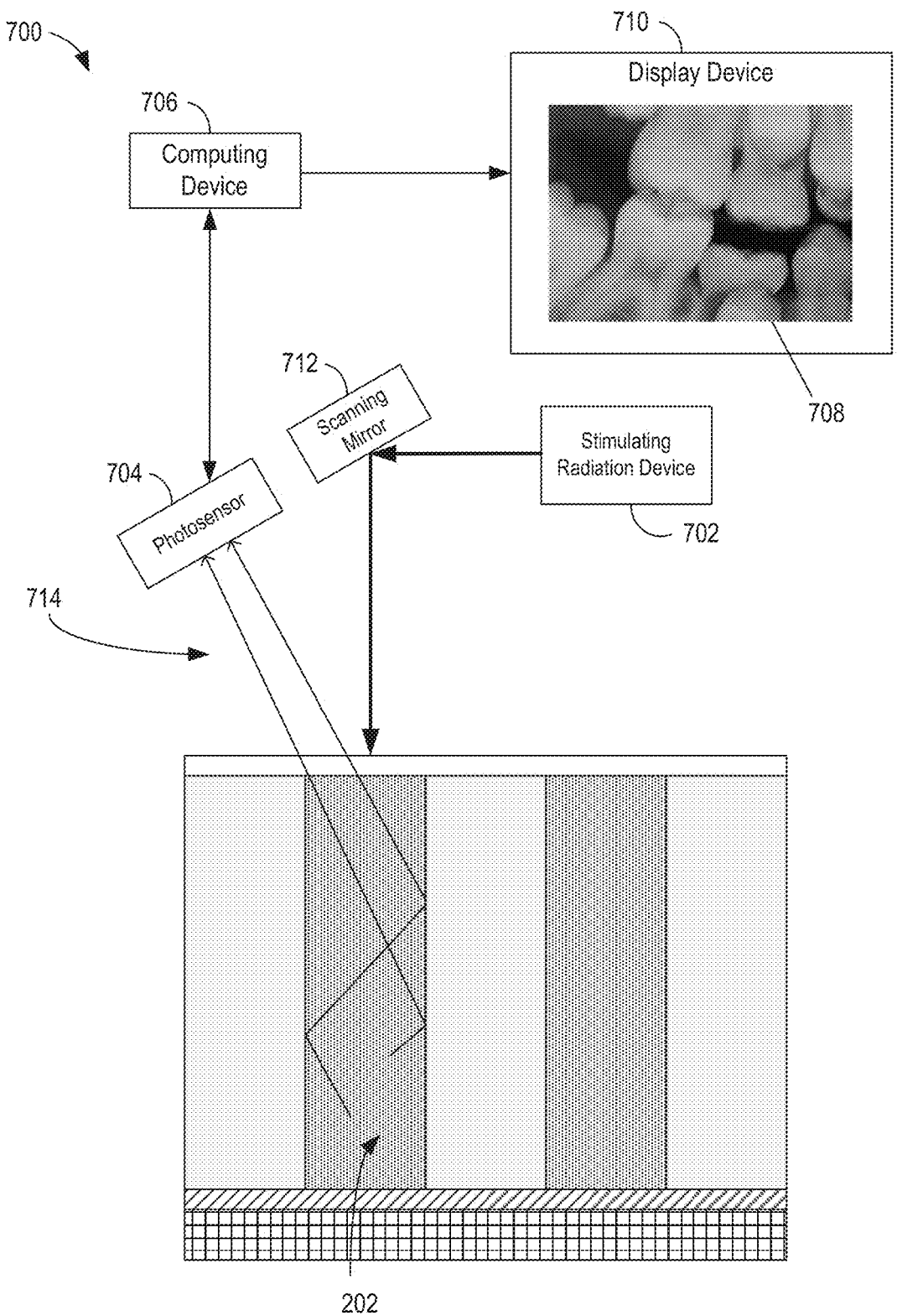
FIG. 7 illustrates a schematic depiction of a computed radiography apparatus in accordance with an embodiment.

In addition, packing the storage phosphor powders into the plurality of voids 102 may help guide stimulated light to the exit surface, limiting its scatter (such as illustrated in the embodiment of FIG. 7). Both of these may improve image quality (i.e., resolution) from the image storage device 200 compared to a conventional CR image storage plate that is coated with a storage phosphor layer using the doctor blade technique.

Referring to FIG. 7, a particular embodiment of a computed radiography apparatus is illustrated and generally designed 700. The CR apparatus 700 of FIG. 7 includes an image storage device (e.g., the image storage device 200 of FIG. 2), a stimulating radiation device 702 to generate stimulating radiation (e.g., laser light), and a photosensor 704 to detect scintillating light (e.g., photostimulated light). It should be noted that, for illustrative purposes only, a cross-sectional view of only a portion of the image storage device 200 of FIG. 2 is shown in FIG. 7.

In a particular embodiment, the stimulating radiation device 702 includes a laser. Persons of ordinary skill in the art will appreciate that the stimulating radiation may include light from a light source other than a laser. A scanning mirror 712 may be used to direct the stimulating radiation at the storage phosphor powder 202 within each of the cells 202. The cells 202 of the image storage device 200 may be arranged in a cell pattern such that a raster pattern of the stimulating radiation device 702 corresponds to the cell pattern. The spot size of the stimulating radiation device 702 may be tuned to the patterned dimensions of the substrate. For example, referring to FIGS. 3 to 5, from a top view, the cells 202 may have a maximum dimension of between about 30 µm and about 50 µm. As such, the spot size of the stimulating radiation device 702 may be tuned to be less than the maximum dimension. To illustrate, when the maximum dimension is about 30 µm, the spot size of the laser may be the same or less than 30 µm such that the photostimulating laser light may be substantially directed at the storage phosphor within the cells 202 rather than the septum 104.

As a simplified example, FIGS. 3 to 5 illustrate a patterned substrate with a 9×9 matrix of cells. In practice, a patterned substrate may contain substantially more cells. In a particular embodiment, a stepper motor or other motion control device may be used to control the movement of the scanning mirror 712 such that the stimulating radiation is substantially directed at the storage phosphor within each of the cells 202 during readout. In this simplified example, the stepper motor may control the movement of the scanning mirror 712 such that the stimulating radiation is directed to each of the cells 202 in the 9×9 matrix of cells in a predetermined sequence.

The raster pattern of the stimulating radiation device 702 may also account for the thickness of the septum 104. In a particular embodiment, the septum 104 may have an average thickness that is not less than about 0.1 µm, such as not less than about 1 µm, not less than about 5 µm, or not less than about 10 µm. As an illustrative, non-limiting example, referring to FIG. 3, the cells 202 may have a width (W) of about 30 µm, and the thickness (T) of the septum 104 may be about 1 µm. In this case, in order to substantially align the laser with the center (from a top view) of each of the cells 202, the stepper motor may advance the scanning mirror 712 by a total distance of about 31 µm. In this case, the total distance of 31 µm may represent the combined total of ½*W (i.e., about 15 µm from the center of the first cell to a wall of the first cell defined by the septum 104), T (i.e., about 1 µm), and ½*W (i.e., about 15 µm from the septum 104 to the center of the second cell).

Persons of ordinary skill in the art will appreciate that the raster pattern of the stimulating radiation device 702 may be adjusted according to the particular arrangement of cells of an image storage device. That is, the raster pattern may be adjusted to account for the maximum dimension of the cells 202 and the thickness of the septum 104.

In a particular embodiment, the photosensor 704 may include a photomultiplier, a photodiode, or a combination thereof. In a particular embodiment, the photosensor 704 may detect light that has a wavelength in a range of between about 300 nm and about 600 nm.

In the embodiment illustrated in FIG. 7, the computed radiography apparatus 700 also includes a computing device 706 to generate a digital image 708 (via a display device 710) based on an electronic pulse from the photosensor 704, where the electronic pulse corresponds to the detected light.

In operation, the stimulating radiation device 702 may generate radiation to stimulate the storage phosphor powder included in each of the cells 202 of the image storage device 200. For example, the stimulating radiation device 702 may be a laser that irradiates the storage phosphor powder with radiation having a wavelength in a range of between about 500 nm and about 800 nm. Exposure to the stimulating radiation may cause the storage phosphor powder to emit radiation 714 (e.g., photostimulated light) that has a shorter wavelength than the stimulating laser light in an amount proportional to the original X-ray irradiation. For example, the stimulating laser light may have a wavelength in a range of between about 500 nm and about 800 nm, while the photostimulated light 714 may have a wavelength in a range of between about 300 nm and about 600 nm.

The photosensor 704 may detect the photostimulated light 714. As noted above, the amount of photostimulated light 714 emitted by the storage phosphor powder may be proportional to the original amount of X-ray irradiation. Thus, the photosensor 704 may generate an electronic pulse that corresponds to the original X-ray irradiation for each of the cells 202. This may allow the computing device 706 to generate a plurality of pixels of the digital image 708, where each pixel corresponds to an individual cell of the plurality of cells 202.

The image storage device of the present disclosure may offer improved resolution of the digital image 708 compared to a digital image generated from a CR imaging plate with a storage phosphor layer applied using a doctor blade approach. The image storage device of the present disclosure may improve image quality using a columnar approach where vertical areas of storage phosphor are distinct from each other. The image storage device of the present disclosure may be formed by packing storage phosphor powder into a plurality of voids of a substrate to form cells, in contrast to CR imaging plates that include vapor deposited needle like structures where vapor deposition is slow, expensive, and potentially size limited.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Item 1. An image storage device can include a substrate including a plurality of voids and a septum disposed between the voids, and cells including a storage phosphor powder within the voids.

Item 2. The image storage device of Item 1, further including a topcoat layer overlying a surface of the substrate and overlying the storage phosphor powder.

Item 3. The image storage device of Item 2, wherein the topcoat layer is substantially free of the storage phosphor powder.

Item 4. The image storage device of Item 2, wherein the surface of the substrate is substantially free of the storage phosphor powder.

Item 5. The image storage device of any one of Items 2 to 4, further including a reflective layer, wherein the substrate is disposed between the topcoat layer and the reflective layer.

Item 6. The image storage device of any one of Items 2 to 5, further including a backing plate, wherein the substrate is disposed between the topcoat layer and the backing plate.

Item 7. The image storage device of any one of the preceding Items, wherein the storage phosphor powder is capable of emitting scintillating light having a wavelength in a range of between about 300 nm and about 600 nm when exposed to stimulating radiation having a wavelength in a range of between about 500 nm and about 800 nm.

Item 8. The image storage device of any one of the preceding Items, wherein the storage phosphor powder includes a barium fluorohalide powder.

Item 9. The image storage device of Item 8, wherein the storage phosphor powder includes $BaFX:RE^{2+}$ powder, wherein X includes Cl, Br, I, or a combination thereof, and wherein RE includes a rare earth element.

Item 10. The image storage device of Item 8, wherein the storage phosphor powder includes $BaFBr:Eu^{2+}$ powder.

Item 11. The image storage device of Item 8, wherein the storage phosphor powder includes $BaFI:Eu^{2+}$ powder.

Item 12. The image storage device of Item 8, wherein the storage phosphor powder includes $BaFBr_{1-x}I_x:Eu^{2+}$ powder, wherein x is not less than 0.001.

Item 13. The image storage device of any one of Items 1 to 7, wherein the storage phosphor powder includes $CsBr:Eu^{2+}$ powder.

Item 14. The image storage device of Item 1, wherein the storage phosphor powder includes $RbBr:Tl^+$ powder.

Item 15. The image storage device of any one of the preceding Items, wherein the cells include a mixture of the storage phosphor powder and a binder.

Item 16. The image storage device of Item 15, wherein the ratio of the binder to the storage phosphor powder on a weight basis is not less than about 0.01:1.

Item 17. The image storage device of Item 15 or 16, wherein the ratio of the binder to the storage phosphor powder on a weight basis is not greater than about 1:1.

Item 18. The image storage device of any one of Items 15 to 17, wherein the binder is substantially transmissive in the emission wavelength of the storage phosphor powder.

Item 19. The image storage device of any one of the preceding Items, wherein, from a top view, the cells include circular shaped cells.

Item 20. The image storage device of any one of Items 1 to 20, wherein, from a top view, the cells include polygonal shaped cells.

Item 21. The image storage device of Item 20, wherein, from a top view, the cells include rectangular shaped cells.

Item 22. The image storage device of Item 20, wherein the cells include hexagonal shaped cells.

Item 23. The image storage device of any one of the preceding Items, wherein the cells have an average depth that is not less than about 100 µm, such as not less than about 200 µm, or not less than about 300 µm.

Item 24. The image storage device of any one of Items, wherein the cells have an average depth that is not greater than about 800 µm, such as not greater than about 700 µm, or not greater than about 600 µm.

Item 25. The image storage device of any one of Items, wherein, from a top view, each of the cells has a maximum dimension that is not less than about 10 µm, such as not less than about 20 µm, or not less than about 30 µm.

Item 26. The image storage device of Item 25, wherein the maximum dimension is not greater than about 70 µm, such as not greater than about 60 µm, or not greater than about 50 µm.

Item 27. The image storage device of any one of the preceding Items, wherein the septum has an average thickness that is not less than about 0.1 µm, such as not less than about 1 µm, not less than about 5 µm, or not less than about 10 µm.

Item 28. The image storage device of any one of the preceding Items, wherein the substrate includes a patterned semiconductor substrate.

Item 29. The image storage device of any one of Items 1 to 27, wherein the substrate includes a patterned metallic substrate.

Item 30. The image storage device of any one of Items 1 to 27, wherein the substrate includes a patterned non-metallic substrate.

Item 31. The image storage device of any one of the preceding Items, wherein the cells are arranged in a cell pattern that corresponds to a raster pattern of a laser that is operable to stimulate the storage phosphor powder.

Item 32. A computed radiography apparatus can include an image storage device including a substrate including a plurality of voids and a septum disposed between the voids, and cells including a storage phosphor powder within the voids. The computed radiography apparatus can further include a stimulating radiation device to generate stimulating radiation and a photosensor to detect light.

Item 33. The computed radiography apparatus of Item 32, wherein the stimulating radiation device includes a laser.

Item 34. The computed radiography apparatus of Item 33, wherein the cells of the image storage device are arranged in a cell pattern and wherein a raster pattern of the laser corresponds to the cell pattern.

Item 35. The computed radiography apparatus of any one of Items 32 to 34, wherein the stimulating radiation has a wavelength in a range of between about 500 nm and about 800 nm.

Item 36. The computed radiography apparatus of any one of Items 32 to 35, wherein the photosensor includes a photomultiplier, a photodiode, or a combination thereof.

Item 37. The computed radiography apparatus of any one of Items 32 to 36, wherein the detected light has a wavelength in a range of between about 300 nm and about 600 nm.

Item 38. The computed radiography apparatus of any one of Items 32 to 37, further including a computing device to generate a digital image based on an electronic pulse from the photosensor, wherein the electronic pulse corresponds to the detected light.

Item 39. A method of forming an image storage device can include providing a patterned substrate that includes a plurality of voids and a septum disposed between the voids, adding a storage phosphor powder into the voids of the patterned substrate to form cells, and applying a topcoat layer that is substantially free of the storage phosphor powder.

Item 40. The method of Item 39, further including etching a substrate to produce the patterned substrate.

Item 41. The method of Item 39 or 40, further including machining a substrate to produce the patterned substrate.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An image storage device, comprising:
   a substrate including a plurality of voids with a septum disposed between each pair of adjacent voids, wherein the substrate is a patterned semiconductor, metallic, or ceramic substrate; and
   a storage phosphor powder within the voids.

2. The image storage device of claim 1, further comprising a topcoat layer overlying a surface of the substrate and overlying the storage phosphor powder wherein the topcoat layer is substantially free of the storage phosphor powder.

3. The image storage device of claim 2, further comprising a reflective layer, wherein the substrate is disposed between the topcoat layer and the reflective layer.

4. The image storage device of claim 2, further comprising a backing plate, wherein the substrate is disposed between the topcoat layer and the backing plate.

5. The image storage device of claim 1, wherein the storage phosphor powder is capable of emitting scintillating light having a wavelength in a range of between about 300 nm and about 600 nm when exposed to stimulating radiation having a wavelength in a range of between about 500 nm and about 800 nm.

6. The image storage device of claim 1, wherein the storage phosphor powder includes a barium halide powder or a barium fluorohalide powder.

7. The image storage device of claim 1, wherein the storage phosphor powder includes $BaFBr:Eu^{2+}$ powder, $BaFI:Eu^{2+}$ powder, $BaFBr_{1-x}I_x:Eu^{2+}$ powder, $CsBnEu^{2+}$ powder, or $RbBr:Tl^+$ powder.

8. The image storage device of claim 1, wherein the cells have an average depth of 100 μm to 800 μm.

9. The image storage device of claim 1, wherein, from a top view, each of the cells has a maximum dimension of 10 μm to 70 μm.

10. The image storage device of claim 1, wherein the cells are arranged in a cell pattern that corresponds to a raster pattern of a laser that is operable to stimulate the storage phosphor powder.

11. A computed radiography apparatus, comprising:
    an image storage device comprising:
        a substrate including a plurality of voids and a septum disposed between the voids, wherein the substrate is a patterned semiconductor, metallic, or ceramic substrate; and
        cells including a storage phosphor powder within the voids;
    a stimulating radiation device to generate stimulating radiation; and
    a photosensor to detect light.

12. The computed radiography apparatus of claim 11, wherein the stimulating radiation device includes a laser.

13. The computed radiography apparatus of claim 12, wherein the cells of the image storage device are arranged in a cell pattern and wherein a raster pattern of the laser corresponds to the cell pattern.

14. The computed radiography apparatus claim 12, wherein the stimulating radiation has a wavelength in a range of between about 500 nm and about 800 nm.

15. The computed radiography apparatus of claim 11, wherein the photosensor comprises a photomultiplier, a photodiode, or a combination thereof.

16. The computed radiography apparatus of claim 11, wherein the detected light has a wavelength in a range of between about 300 nm and about 600 nm.

17. The computed radiography apparatus of claim 11, further comprising a computing device to generate a digital image based on an electronic pulse from the photosensor, wherein the electronic pulse corresponds to the detected light.

18. A method of forming an image storage device, the method comprising:
    providing a patterned substrate that includes a plurality of voids and septa disposed between the voids wherein the patterned substrate is a patterned semiconductor, metallic, or ceramic substrate;
    adding a storage phosphor powder into the voids of the patterned substrate to form cells; and
    applying a topcoat layer that is substantially free of the storage phosphor powder.

19. The method of claim 18 in which providing a patterned substrate comprises etching the substrate to produce a plurality of voids in the substrate.

20. The method of claim 18 in which providing a patterned substrate comprises machining the substrate to produce a plurality of voids in the substrate.

21. An X-ray imaging device, comprising:
    a substrate defining a plurality of voids, wherein the substrate is a patterned semiconductor, metallic, or ceramic substrate;
    a plurality of cells formed by at least partially filling the voids with a storage phosphor powder that absorbs energy when irradiated with X-rays and then, when exposed to laser light, emits scintillating light in proportion to the amount of energy stored during radiation.

22. The X-ray imaging device of claim 21 in which adjacent cells are separated by a wall that prevents the spread of laser light and of emitted light between adjacent cells.

23. The X-ray imaging device of claim 22 in which the plurality of voids are vertically oriented columnar voids passing completely through the substrate.

24. The X-ray imaging device of claim 21 further comprising a topcoat layer that is substantially free of storage phosphor powder overlying a surface of the substrate and overlying the storage phosphor powder.

25. The X-ray imaging device of claim 21, wherein the storage phosphor powder is emits scintillating light having a wavelength in a range of between about 300 nm and about 600 nm when exposed to laser light having a wavelength in a range of between about 500 nm and about 800 nm.

\* \* \* \* \*